United States Patent
Jo (10) Patent No.: US 11,220,990 B2
(45) Date of Patent: Jan. 11, 2022

(54) METHOD AND DEVICE FOR CONTROLLING START OF VEHICLE

(71) Applicants: Hyundai Motor Company, Seoul (KR); Kia Motors Corporation, Seoul (KR)

(72) Inventor: Sunmyoung Jo, Ansan-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 41 days.

(21) Appl. No.: 16/945,442

(22) Filed: Jul. 31, 2020

(65) Prior Publication Data

US 2021/0164431 A1 Jun. 3, 2021

(30) Foreign Application Priority Data

Nov. 29, 2019 (KR) .................. 10-2019-0157337
Jul. 13, 2020 (KR) .................. 10-2020-0086393

(51) Int. Cl.
*F02N 11/08* (2006.01)
*B60W 10/06* (2006.01)
(Continued)

(52) U.S. Cl.
CPC ......... *F02N 11/0862* (2013.01); *B60W 10/06* (2013.01); *B60W 10/18* (2013.01); *B60W 30/02* (2013.01); *F02N 11/0848* (2013.01); *G07C 5/0841* (2013.01); *B60W 2510/0638* (2013.01); *B60W 2510/0676* (2013.01); *B60W 2510/1005* (2013.01); *B60W 2510/244* (2013.01); *B60W 2520/00* (2013.01); *B60W 2540/10* (2013.01); *B60W 2540/12* (2013.01); (Continued)

(58) Field of Classification Search
CPC ............. F02N 11/0862; F02N 11/0848; F02N 2200/102; F02N 2200/022; F02D 41/062; F02D 2200/101; B60W 10/06; B60W 10/18; B60W 30/02; B60W 2510/0638; B60W 2510/0676; B60W 2510/1005; B60W 2510/244; G07C 5/0841
See application file for complete search history.

(56) References Cited

U.S. PATENT DOCUMENTS

8,798,833 B2 8/2014 Kusumi et al.
9,333,872 B2 5/2016 Maya et al.
(Continued)

*Primary Examiner* — George C Jin
(74) *Attorney, Agent, or Firm* — Morgan, Lewis & Bockius LLP (57) ABSTRACT

A method for controlling a start of a vehicle using a controller includes: determining whether revolutions per minute (RPM) of an engine is within a reference range when start of the vehicle is requested; determining whether state data for controlling the vehicle satisfies a control condition for controlling a start of the vehicle when RPM of the engine is within the reference range; determining whether a position value of an accelerator pedal is less than or equal to a reference position value when the state data satisfies the control condition; determining whether a speed of the vehicle is greater than or equal to a reference speed when the position value of the accelerator pedal is less than or equal to the reference position value; and controlling a brake device when speed of the vehicle is greater than or equal to the reference speed.

17 Claims, 4 Drawing Sheets

(51) Int. Cl.
*B60W 30/02* (2012.01)
*G07C 5/08* (2006.01)
*B60W 10/18* (2012.01)

(52) U.S. Cl.
CPC .. *F02N 2200/022* (2013.01); *F02N 2200/024* (2013.01); *F02N 2200/061* (2013.01); *F02N 2200/0801* (2013.01); *F02N 2200/0802* (2013.01); *F02N 2200/101* (2013.01); *F02N 2200/102* (2013.01)

(56) References Cited

U.S. PATENT DOCUMENTS

| | | | |
|---|---|---|---|
| 9,545,900 B2* | 1/2017 | Moriya | B60W 30/18063 |
| 9,855,941 B2* | 1/2018 | Kato | B60W 30/18018 |
| 2002/0086772 A1* | 7/2002 | Abe | B60W 10/04 |
| | | | 477/102 |
| 2005/0197235 A1* | 9/2005 | Boe | B60W 10/182 |
| | | | 477/107 |
| 2017/0191458 A1* | 7/2017 | Morimura | B60W 10/184 |
| 2019/0136817 A1* | 5/2019 | Pilzweger | B60W 30/18118 |

* cited by examiner

FIG. 4

# METHOD AND DEVICE FOR CONTROLLING START OF VEHICLE

CROSS-REFERENCE TO RELATED APPLICATION

The present application claims priority to Korean Patent Application No. 10-2019-0157337 filed on Nov. 29, 2019 and Korean Patent Application No. 10-2020-0086393 filed on Jul. 13, 2020, the entire contents of which is incorporated herein for all purposes by this reference.

BACKGROUND OF THE INVENTION

Field of the Invention

The present invention relates to a starting control apparatus of a vehicle, and more particularly, to a method and a device configured for controlling a start of a vehicle capable of controlling speed of the vehicle during initial starting.

Description of Related Art

In general, a vehicle is driven by transmitting power generated by an engine to a driving wheel through a power delivery device. The engine receives air and fuel from an outside thereof and combusts a mixture of air and fuel in a combustion chamber to generate power.

When a driver of the vehicle requests start of the vehicle using a start button or an ignition key, the engine spontaneously starts so that revolutions per minute (RPM) of the engine increases to an idle RPM before the start.

In a case of a cold-start or when voltage of a battery is insufficient, the vehicle maintains the idle RPM at a high RPM to increase load of the engine. For example, the engine's idle RPM may be about 550-800 RPM in a case of a normal start, but the engine's idle RPM may be about 1000-1800 RPM in the case of the cold-start.

When a driver of the vehicle inexperienced in the cold-start does not check the engine's idle RPM and releases a brake pedal immediately after requesting the start of the vehicle, the vehicle may rapidly start due to high speed of the vehicle caused by the high RPM so that a likelihood of an accident increases.

Furthermore, the driver may be surprised or embarrassed because the vehicle speed is rapidly increased. Since the vehicle starts without a will of the driver, the driver may have perception that a quality of the vehicle is low.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method and a device configured for controlling a start of a vehicle configured for controlling speed of a vehicle during initial starting.

Furthermore, various aspects of the present invention are directed to providing the method and the device configured for controlling a start of the vehicle configured for providing a braking force of the vehicle when the start is requested in a case of a cold-start of the vehicle or in a case that voltage of a battery is insufficient.

Various exemplary embodiments of the present invention may provide the method for controlling a start of the vehicle, including: determining, by a controller, whether revolutions per minute (RPM) of an engine of the vehicle is within a reference range when the start of the vehicle is requested; determining, by the controller, whether state data for controlling the vehicle satisfies a control condition for controlling the start of the vehicle when the revolutions per minute (RPM) of the engine is within the reference range; determining, by the controller, whether a position value of an accelerator pedal of the vehicle is less than or equal to a first reference position value when the state data satisfies the control condition; determining, by the controller, whether a speed of the vehicle is greater than or equal to a reference speed when the position value of the accelerator pedal is less than or equal to the first reference position value; and controlling, by the controller, a brake device of the vehicle when the speed of the vehicle is greater than or equal to the reference speed.

The determining whether the state data satisfies the control condition may include: determining, by the controller, whether a shifting stage of a transmission of the vehicle is a driving (D) stage; and determining, by the controller, whether a position value of a brake pedal of the vehicle is less than or equal to a second reference position value when the shifting stage is the driving (D) stage.

The determining whether the position value of the accelerator pedal is less than or equal to the first reference position may include: determining, by the controller, whether a state of charge (SOC) value of a battery supplying power to an starter of the vehicle is equal to or less than a reference amount when the state data satisfies the control condition; and determining, by the controller, whether the position value of the accelerator pedal is less than or equal to the first reference position when the state of charge (SOC) value of the battery is less than or equal to the reference amount.

The determining whether the position value of the accelerator pedal is less than or equal to the first reference position may include: determining, by the controller, whether a temperature of a coolant of the engine or a temperature of an oil of the engine is less than or equal to a reference temperature when the state data satisfies the control condition; and determining, by the controller, whether the position value of the accelerator pedal is less than or equal to the first reference position when the temperature of the coolant or the temperature of the oil is less than or equal to the reference temperature.

The controlling the brake device may include: controlling, by the controller, the brake device so that the vehicle is braked by a control value when the speed of the vehicle is greater than or equal to the reference speed.

Various exemplary embodiments of the present invention may provide the device configured for controlling a start of the vehicle, including: an engine which is a power source of the vehicle; a brake device mounted in the vehicle and configured to brake the vehicle; a state detector configured to detect state data for controlling the vehicle; and a controller connected to the state detector and configured to determine whether revolutions per minute (RPM) of the engine is within a reference range when the start of the vehicle is requested, determine whether the state data satisfies a control condition for controlling the start of the vehicle when the revolutions per minute (RPM) of the engine is within the reference range, determine whether a position value of an accelerator pedal of the vehicle is less than or equal to a first reference position value when the state data satisfies the control condition, determine whether a speed of the vehicle is greater than or equal to a reference speed when the position value of the accelerator pedal is less than or equal to the first reference position value, and control the brake device when the speed of the vehicle is greater than or equal to the reference speed.

The controller may be configured to determine that the state data satisfies the control condition when a shifting stage of a transmission of the vehicle is a driving (D) stage and a position value of a brake pedal of the vehicle is less than or equal to a second reference position value.

The controller may be configured to determine whether a state of charge (SOC) value of a battery supplying power to an starter of the vehicle is equal to or less than a reference amount when the state data satisfies the control condition and to determine whether the position value of the accelerator pedal is less than or equal to the first reference position when the state of charge (SOC) value of the battery is less than or equal to the reference amount.

The controller may be configured to determine whether a temperature of a coolant of the engine or a temperature of an oil of the engine is less than or equal to a reference temperature when the state data satisfies the control condition and to determine whether the position value of the accelerator pedal is less than or equal to the first reference position when the temperature of the coolant or the temperature of the oil is less than or equal to the reference temperature.

The device configured for controlling a start of the vehicle may further include: an electronic stability control (ESC) device connected to the controller and configured to stabilize a posture of the vehicle. The controller may be configured to control the brake device using the electronic stability control (ESC) device.

The state detector may include: a revolutions per minute (RPM) detector configured to detect the revolutions per minute (RPM) of the engine; a shifting stage detector configured to detect a shifting stage of a transmission of the vehicle; a brake pedal position detector configured to detect a position value of a brake pedal of the vehicle; a speed detector configured to detect a speed of the vehicle; a state of charge (SOC) detector configured to detect a state of charge (SOC) value of the battery supplying power to an starter of the vehicle; a coolant temperature detector configured to detect a temperature of a coolant of the engine; an oil temperature detector configured to detect a temperature of an oil of the engine; and an accelerator pedal position detector configured to detect a position value of the accelerator pedal.

The method and the device configured for controlling a start of the vehicle according to the exemplary embodiment of the present invention may control speed of the vehicle during initial starting so that the exemplary embodiment of the present invention prevents an accident caused by sudden start and eliminates dissatisfaction of a driver of the vehicle.

Furthermore, the exemplary embodiment of the present invention may improve drivability of the vehicle by providing the braking force of the vehicle when the start is requested in the case of the cold-start of the vehicle or in the case that voltage of the battery is insufficient.

In addition to the aforementioned advantageous effect, an effect which may be obtained or anticipated by applying various exemplary embodiments of the present invention will be included explicitly or implicitly in the detailed description of the exemplary embodiment of the present invention. In other words, various effects expected by applying various exemplary embodiments of the present invention will be included within the detailed description to be provided later.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, an operation principle of a device and a method for controlling a start of a vehicle of the present invention will be described in detail with reference to the description and the accompanying drawings. However, the drawings and the detailed description relate to an exemplary embodiment among several exemplary embodiments for effectively describing features of the present invention. Therefore, the present invention is not limited only to the drawings and description.

Furthermore, in describing below exemplary embodiments of the present invention, the related well-known functions or constructions will be omitted in detail since they may unnecessarily obscure the understanding of the present invention. Furthermore, the following terminologies are defined in consideration of the functions in various exemplary embodiments of the present invention and may be construed in different ways by the intention of users and operators, practice, or the like. Therefore, the definitions thereof may be construed based on the contents throughout the specification.

Furthermore, to effectively describe core technical features of the present invention, terms may be appropriately changed, integrated, or separated for those skilled in the art in a technical field to which various exemplary embodiments of the present invention belongs to explicitly understand the present invention, but the present invention is not limited thereto.

Hereinafter, a various exemplary embodiments of the present invention will be described in detail with reference to the accompanying drawings.

Figure 1:
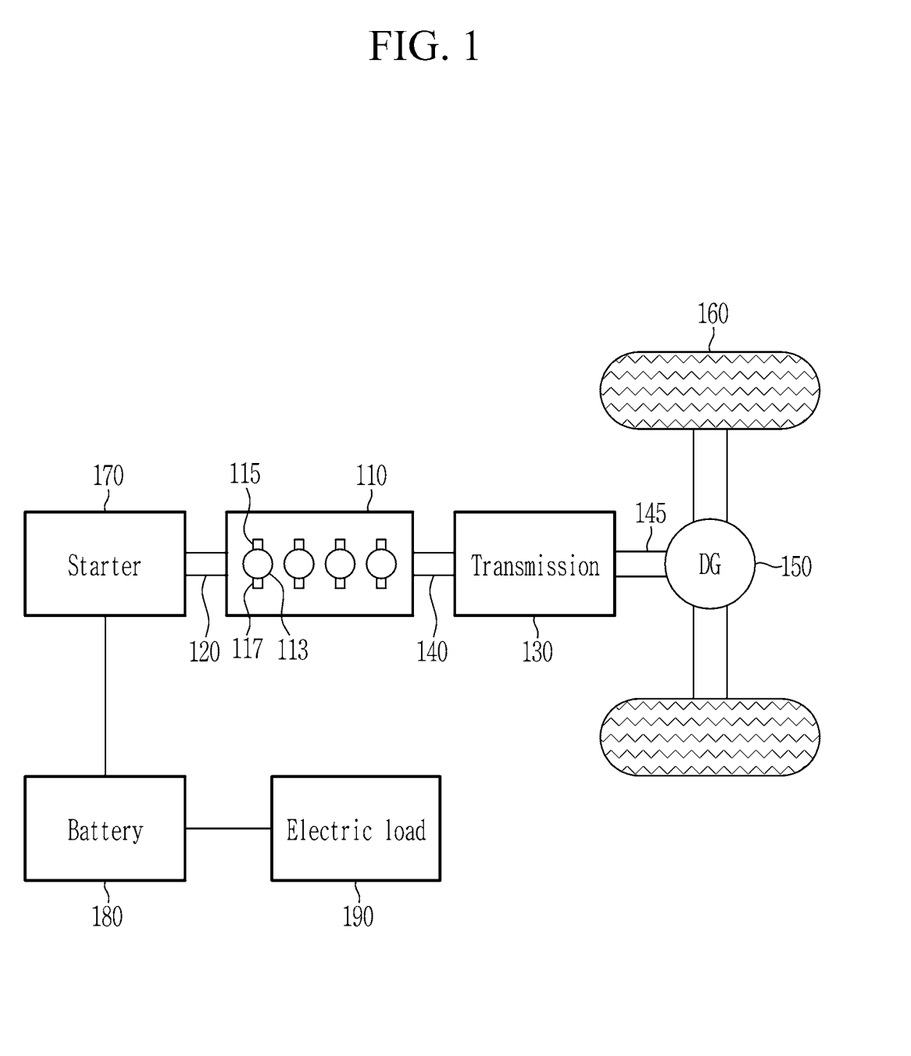
FIG. 1 is a schematic diagram showing a vehicle to which a method for controlling a start of a vehicle according to various exemplary embodiments of the present invention is applied.

FIG. 1 is a schematic diagram showing a vehicle to which a method for controlling a start of a vehicle according to various exemplary embodiments of the present invention is applied.

Referring to FIG. 1, the vehicle may include an engine 110, a transmission 130, a differential gear device 150, a driving wheel 160, a starter 170, and a battery 180.

The engine 110 may combust fuel to generate torque. The engine 110 may convert chemical energy into mechanical energy by combusting fuel and air. The engine 110 may generate combustion torque by controlling an ignition timing, an air amount, a fuel amount, and an air-fuel ratio.

For example, the engine 110 may be a gasoline engine, a diesel engine, or a liquefied petroleum injection (LPI) engine.

The engine 110 may include combustion chambers 113, ignition devices 115, and injectors 117.

Fuel and air may flow in the combustion chamber 113, the ignition device 115 may ignite a mixture of the fuel and the air flowed in the combustion chamber 113, and the injector 117 may inject fuel into the combustion chamber 113.

In a power delivery of the vehicle, torque of the engine 110 may be transmitted to an input shaft 140 of the transmission 130, and a torque output from an output shaft 145 of the transmission 130 may be transmitted to an axle via the differential gear device 150. When the axle rotates the driving wheel 160, the vehicle may be driven by torque of the engine 110.

The transmission 130 may convert an output torque of the engine 110 to a target torque. The transmission 130 may select a shifting stage or a transmission stage according to the vehicle speed and a position value of an accelerator pedal of the vehicle to convert a received torque to the target torque, and may output the converted target torque to the driving wheel 160 to drive the vehicle.

The transmission 130 may be an automatic transmission or a manual transmission.

The starter 170 may start the engine 110. The starter 170 may be directly connected to a crankshaft 120 of the engine 110 to start the engine 110.

The battery 180 may include a plurality of unit cells, and may supply power to the starter 170 and an electric load 190.

The electric load 190 may be a low-power component. For example, the electric load 190 may include a light, an instrument, a warning display device, an air conditioner, or a sunroof.

Figure 2:
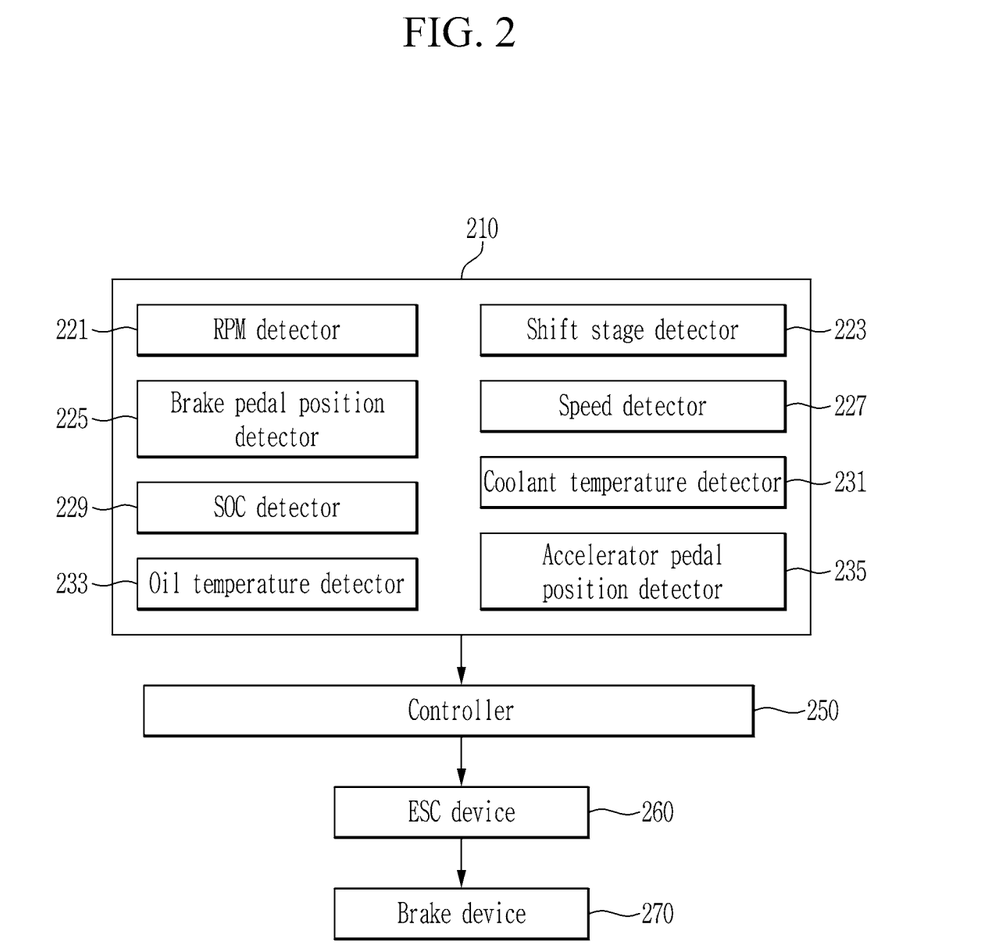
FIG. 2 is a block diagram showing a device configured for controlling a start of the vehicle according to various exemplary embodiments of the present invention.

FIG. 2 is a block diagram showing a device configured for controlling a start of the vehicle according to various exemplary embodiments of the present invention.

Referring to FIG. 2, the device configured for controlling a start of the vehicle may include a state detector 210, a controller (e.g., a vehicle controller) 250, an electronic stability control (ESC) device 260, and a brake device 270.

The state detector 210 may detect state data for controlling the vehicle. The state detector 210 may include a revolutions per minute (RPM) detector 221, a shifting stage detector 223, a brake pedal position detector 225, a speed detector 227, a state of charge (SOC) detector 229, a coolant temperature detector 231, an oil temperature detector 233, and an accelerator pedal position detector 235.

The revolutions per minute (RPM) detector 221 may detect revolutions per minute (RPM) of the engine 110. The revolutions per minute (RPM) detector 221 may provide the detected RPM of the engine 110 to the controller 250.

The shifting stage detector 223 may detect a shifting stage currently engaged in the transmission 130 to provide a signal corresponding to the detected shifting stage to the controller 250.

The brake pedal position detector 225 may detect a degree to which a driver of the vehicle presses a brake pedal of the vehicle. The brake pedal position detector 225 may detect a position value of the brake pedal (i.e., a degree to which the brake pedal is pressed) to provide a signal corresponding to the detected value to the controller 250.

A position value of the brake pedal may be 100% when the brake pedal is fully pressed, and the position value of the brake pedal may be 0% when the brake pedal is not pressed.

In another exemplary embodiment of the present invention, the brake pedal position detector 225 may detect an on state or an off state of the brake pedal instead of the position value of the brake pedal.

The speed detector 227 may detect a speed of the vehicle, and may provide the detected speed to the controller 250. The speed detector 227 may be mounted on the driving wheel 160 of the vehicle.

The SOC detector 229 may detect a state of charge (SOC) value of the battery 180 and may provide the detected SOC to the controller 250.

In the absence of the SOC detector 229, the controller 250 may predict an SOC value of the battery 180 using a current and a voltage of the battery 180.

The coolant temperature detector 231 may detect a temperature of a coolant of the engine 110 to provide the detected temperature to the controller 250.

The oil temperature detector 233 may detect a temperature of an oil of the engine 110 to provide the detected temperature to the controller 250.

The accelerator pedal position detector 235 may detect an amount to which the driver presses the accelerator pedal. The accelerator pedal position detector 235 may detect a position value of the accelerator pedal (i.e., a degree to which the accelerator pedal is pressed) to provide a signal corresponding to the detected value to the controller 250.

A position value of the accelerator pedal may be 100% when the accelerator pedal is fully pressed, and the position value of the accelerator pedal may be 0% when the accelerator pedal is not pressed.

In another exemplary embodiment of the present invention, a throttle valve opening detector mounted on an intake passage of the vehicle may be used instead of the accelerator pedal position detector 235. The accelerator pedal position detector 235 may include the throttle valve opening detector.

The controller 250 may control an overall operation of the vehicle and may control the state detector 210, the ESC device 260, and the brake pedal.

The controller 250 may receive the state data from the status detector 210. In more detail, the controller 250 may receive the RPM of the engine 110 from the RPM detector 221, may receive the shifting stage from the shifting stage detector 223, may receive the brake pedal position value from the brake pedal position detector 225, may receive the vehicle speed from the speed detector 227, may receive the SOC value of the battery 180 from the SOC detector 229, may receive the coolant temperature from the coolant temperature detector 231, may receive the oil temperature from the oil temperature detector 233, and may receive the accelerator pedal position value from the accelerator pedal position detector 235.

When the RPM of the engine 110 exists in a reference range, the controller 250 may determine whether the state data satisfies a control condition. The control condition may be a condition set in advance to control start of the vehicle.

The controller 250 may determine whether the accelerator pedal position value is less than or equal to a reference position value and the vehicle speed is greater than or equal to a reference speed when the state data satisfies the control condition. The controller 250 may control the brake device 270 through the ESC device 260 when the accelerator pedal position value is less than or equal to the reference position value and the vehicle speed is greater than or equal to the reference speed.

The controller 250 may be implemented as at least one microprocessor operated by a program. The program may include a series of commands for executing the method for controlling a start of the vehicle according to the exemplary embodiment of the present invention described below. The controller 250 will be described in more detail referring to FIG. 3 and FIG. 4.

The ESC device 260 may stabilize the vehicle's posture by individually applying hydraulic pressure braking force to four driving wheels 160 of the vehicle.

The ESC device 260 may control the brake device 270 according to a control of the controller 250 to provide a braking force to the vehicle.

The brake device 270 may brake the vehicle. The brake device 270 may decelerate or stop the vehicle. The brake device 270 may include a master cylinder that generates hydraulic pressure by a booster's power generated when the driver operates the brake pedal and a wheel brake that generates braking force for constraining rotation of the driving wheel 160 by converting hydraulic pressure supplied from the master cylinder to mechanical force.

The brake device 270 may independently brake each driving wheel 160 of the vehicle.

The method for controlling a start of the vehicle will be described with reference to FIG. 3 and FIG. 4.

Figure 3:
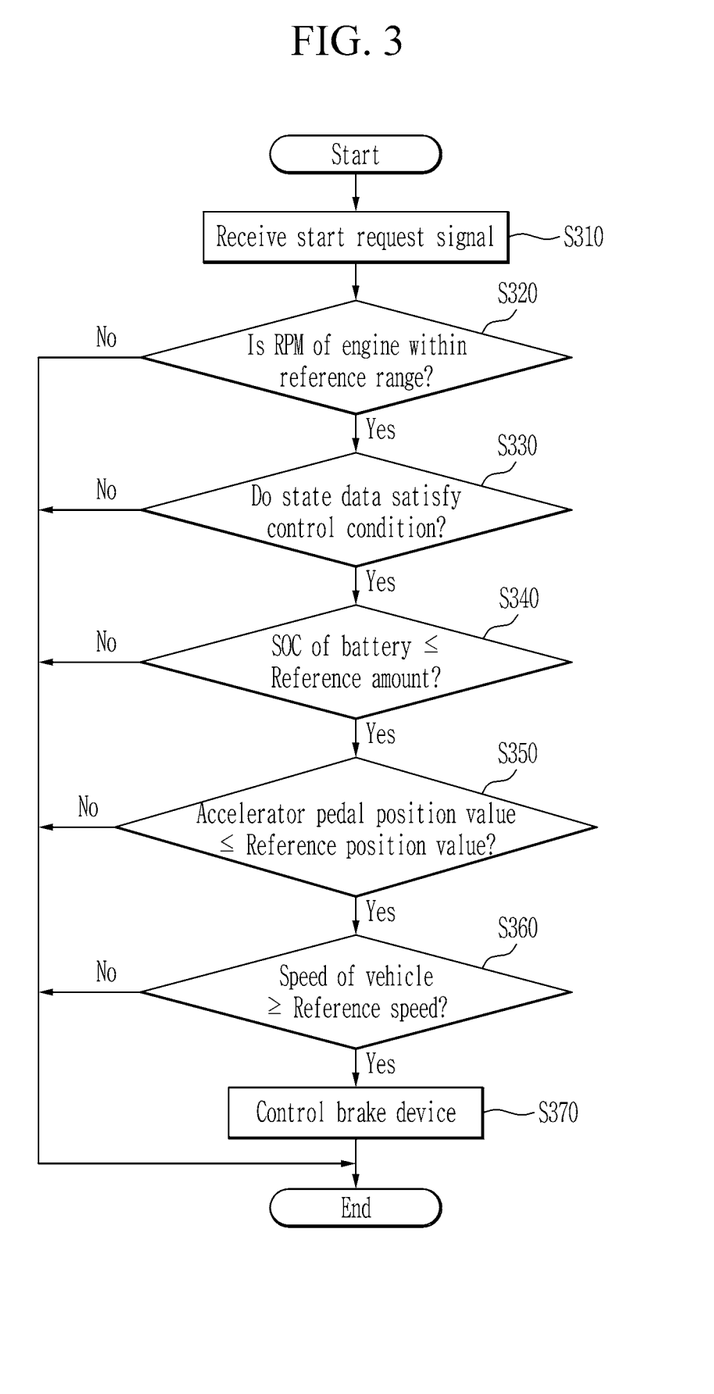
FIG. 3 is a flowchart showing the method for controlling a start of the vehicle according to the exemplary embodiment of the present invention.

FIG. 3 is a flowchart showing the method for controlling a start of the vehicle according to the exemplary embodiment of the present invention.

Referring to FIG. 3, the controller 250 may receive a start request signal in step S310. The controller 250 may receive the start request signal from an ignition key or a start button of the vehicle when the driver requests start of the vehicle through the ignition key or the start button.

The controller 250 may determine whether RPM of the engine 110 is within a reference range in step S320.

In more detail, the RPM detector 221 may detect the RPM of the engine 110 to provide the detected RPM to the controller 250. The controller 250 may receive the RPM of the engine 110 from the RPM detector 221 to determine whether the received RPM is within the reference range. The reference range may indicate an RPM that the engine 110 has to maintain to charge the battery 180 when voltage of the battery is insufficient at start of the vehicle, and may be set in advance. For example, the reference range may be 1200-1800 RPM which is a high RPM.

The controller 250 may stop the method for controlling a start of the vehicle when the RPM of the engine 110 does not exist within the reference range.

The controller 250 may determine whether the state data satisfies the control condition when the RPM of the engine 110 is within the reference range in step S330.

For example, the controller 250 may receive a shifting stage from the shifting stage detector 223 when the RPM of the engine 110 is within the reference range. The controller 250 may determine whether the shifting stage is changed from a parking (P) stage to a driving (D) stage.

The controller 250 may determine that the control condition is satisfied when the shifting stage is changed to the D stage and the brake pedal position value is less than or equal to a reference position value and the shifting stage is changed to the D stage. The reference position value may be a value for determining whether the driver depresses the brake pedal, and may be set in advance. For example, the reference position value may be 0%.

The controller 250 may stop the method for controlling a start of the vehicle when the shifting stage is not the D stage or the brake pedal position value is greater than or equal to the reference position value.

The controller 250 may determine whether an SOC value of the battery 180 is equal to or less than a reference amount when the state data satisfies the control condition in step S340.

In more detail, the controller 250 may receive the SOC value of the battery 180 from the SOC detector 229 when the shifting stage is the D stage and the brake pedal position value is less than or equal to the reference position value. The controller 250 may determine whether the SOC value of the battery 180 detected by the SOC detector 229 is equal to or less than the reference amount. The reference amount may be a value for determining whether voltage of the battery 180 is insufficient, and may be set in advance.

The controller 250 may stop the method for controlling a start of the vehicle when the SOC value of the battery 180 exceeds the reference amount.

The controller 250 may determine whether the accelerator pedal position value is less than or equal to a reference position value when the SOC value of the battery 180 is less than or equal to the reference amount in step S350.

In more detail, the controller 250 may receive the accelerator pedal position value from the accelerator pedal position detector 235 when the battery SOC is less than or equal to the reference amount. The controller 250 may determine whether the accelerator pedal position value is less than or equal to the reference position value. The reference position value may be a value for determining whether the driver depresses the accelerator pedal, and may be set in advance. For example, the reference position value may be 0%.

When the accelerator pedal position value exceeds the reference position value, the controller 250 may stop the method for controlling a start of the vehicle.

When the accelerator pedal position value is less than or equal to the reference position value, the controller 250 may determine whether a speed of the vehicle is greater than or equal to the reference speed in step S360.

In more detail, the controller 250 may receive the vehicle speed from the speed detector 227 when the accelerator pedal position value is less than or equal to the reference position value. The controller 250 may determine whether the vehicle speed is greater than or equal to the reference speed. The reference speed may indicate a speed for determining whether the vehicle is moving by a driving torque of the engine 110 in a state where the driver does not press the accelerator pedal.

When the vehicle speed is less than the reference speed, the controller 250 may stop the method for controlling a start of the vehicle.

The controller 250 may control the brake device 270 when the vehicle speed is greater than or equal to the reference speed in step S370. In more detail, the controller 250 may control the brake device 270 through the ESC device 260 when the vehicle speed is greater than or equal to the reference speed, preventing the vehicle from starting without the driver's will.

Figure 4:
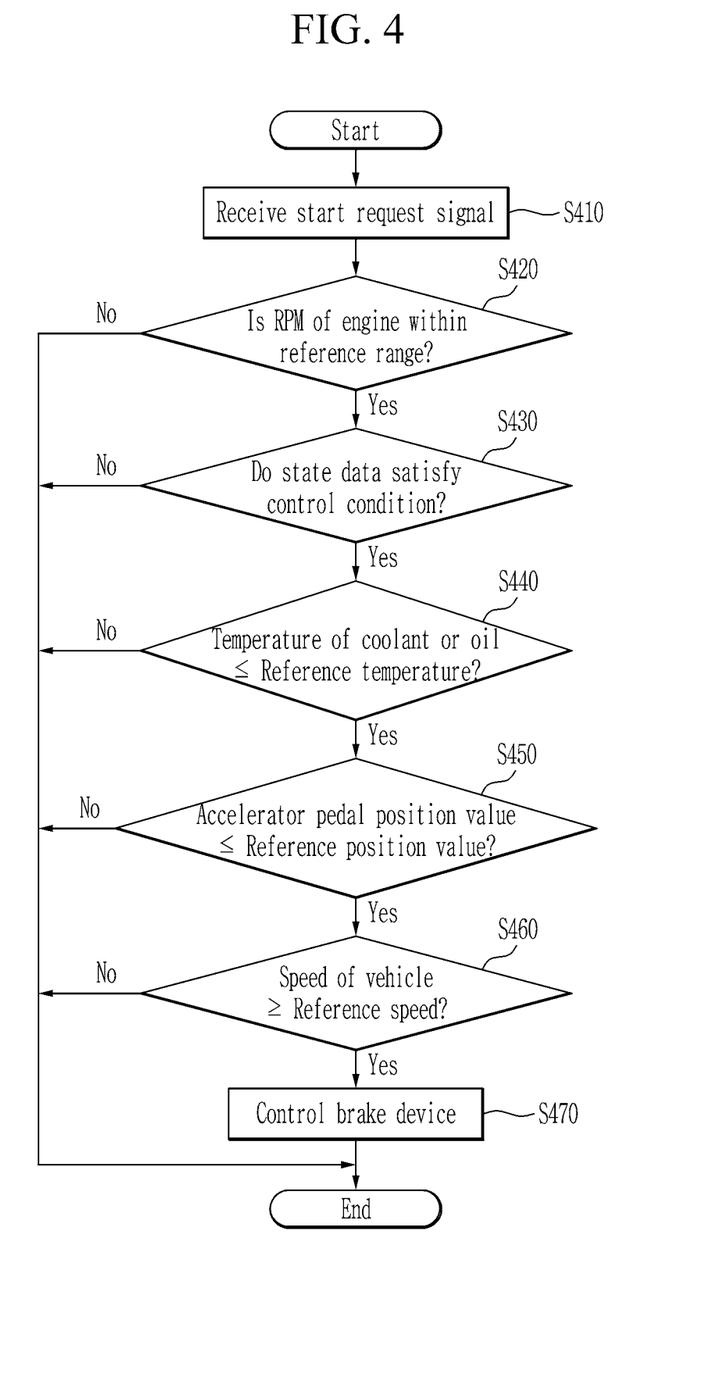
FIG. 4 is a flowchart showing the method for controlling a start of the vehicle according to various exemplary embodiments of the present invention.

FIG. 4 is a flowchart showing the method for controlling a start of the vehicle according to various exemplary embodiments of the present invention.

Referring to FIG. 4, the controller 250 may receive a start request signal from an ignition key or a start button of the vehicle in step S410.

The controller 250 may determine whether RPM of the engine 110 is within a reference range in step S420.

In more detail, the RPM detector 221 may detect the RPM of the engine 110 to provide the detected RPM to the controller 250. The controller 250 may receive the RPM of the engine 110 from the RPM detector 221 to determine whether the received RPM is within the reference range. The reference range may indicate an RPM that the engine 110 has to maintain to increase a temperature of the coolant of the engine or a temperature of the oil of the engine by preheating the engine when a start of the vehicle is a cold-start, and may be set in advance. For example, the reference range may be 1200-1800 RPM which is a high RPM.

The controller 250 may stop the method for controlling a start of the vehicle when the RPM of the engine 110 does not exist within the reference range. The controller 250 may determine whether the state data satisfies the control condition when the RPM of the engine 110 is within the reference range in step S430.

For example, the controller 250 may determine whether a shifting stage of the transmission 130 is a driving (D) stage and the brake pedal position value is less than or equal to a reference position value (e.g., 0%) based on the state data. The reference position value may be a value for determining whether the driver depresses the brake pedal, and may be set in advance.

The controller 250 may determine whether a temperature of the coolant of the engine 110 or a temperature of the oil of the engine is less than or equal to a reference temperature when the state data satisfies the control condition in step S440.

In more detail, the controller 250 may receive the coolant temperature from the coolant temperature detector 231 when the shifting stage is the D stage and the brake pedal position value is less than or equal to the reference position value. The controller 250 may determine whether the coolant temperature is less than or equal to the reference temperature. The reference temperature may be a value for determining whether a start of the vehicle is the cold-start, and may be set in advance.

Furthermore, the controller 250 may receive the oil temperature from the oil temperature detector 233. The controller 250 may determine whether the oil temperature is less than or equal to the reference temperature.

The controller 250 may determine whether the accelerator pedal position value is less than or equal to a reference position value when the coolant temperature or the oil temperature is less than or equal to the reference temperature in step S450.

In more detail, the controller 250 may receive the accelerator pedal position value from the accelerator pedal position detector 235 when the coolant temperature or the oil temperature is less than or equal to the reference temperature. The controller 250 may determine whether the accelerator pedal position value is less than or equal to the reference position value (e.g., 0%). The reference position value may be a value for determining whether the driver depresses the accelerator pedal, and may be set in advance.

When the accelerator pedal position value is less than or equal to the reference position value, the controller 250 may determine whether a speed of the vehicle is greater than or equal to the reference speed in step S460.

In more detail, the controller 250 may receive the vehicle speed from the speed detector 227 when the accelerator pedal position value is less than or equal to the reference position value. The controller 250 may determine whether the vehicle speed is greater than or equal to the reference speed. The reference speed may indicate a speed for determining whether the vehicle is moving by a driving torque of the engine 110 in a state where the driver does not press the accelerator pedal.

The controller 250 may control the brake device 270 when the vehicle speed is greater than or equal to the reference speed in step S470. In more detail, the controller 250 may control the brake device 270 through the ESC device 260 when the vehicle speed is greater than or equal to the reference speed, preventing the vehicle from starting without the driver's will. The ESC device 260 may control the brake device 270 so that the vehicle is braked by a control value. The control value may be set in advance to brake the vehicle.

The method for controlling a start of the vehicle according to the exemplary embodiment of the present invention may provide a braking force of the vehicle by controlling the brake device 270 when the start is requested in a case of a cold-start of the vehicle or in a case that voltage of a battery is insufficient. Thus, the exemplary embodiment of the present invention may prevent an accident caused by a forward movement of the vehicle and may eliminate dissatisfaction of the driver.

Furthermore, the term "controller" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method for controlling a start of a vehicle, the method comprising:
    determining, by a controller, whether revolutions per minute (RPM) of an engine of the vehicle is within a reference range upon determining that the start of the vehicle is requested;
    determining, by the controller, whether state data for controlling the vehicle satisfies a control condition for controlling the start of the vehicle upon determining that the revolutions per minute (RPM) of the engine is within the reference range;
    determining, by the controller, whether a position value of an accelerator pedal of the vehicle is less than or equal to a first reference position value upon determining that the state data satisfies the control condition;
    determining, by the controller, whether a speed of the vehicle is greater than or equal to a reference speed upon determining that the position value of the accelerator pedal is less than or equal to the first reference position value; and
    controlling, by the controller, a brake device of the vehicle upon determining that the speed of the vehicle is greater than or equal to the reference speed.

2. The method of claim 1, wherein the determining whether the state data satisfies the control condition includes:
    determining, by the controller, whether a shifting stage of a transmission of the vehicle is a driving (D) stage; and
    determining, by the controller, whether a position value of a brake pedal of the vehicle is less than or equal to a second reference position value upon determining that the shifting stage is the driving (D) stage.

3. The method of claim 1, wherein the determining whether the position value of the accelerator pedal is less than or equal to the first reference position includes:
    determining, by the controller, whether a state of charge (SOC) value of a battery supplying power to an starter of the vehicle is equal to or less than a reference amount upon determining that the state data satisfies the control condition; and
    determining, by the controller, whether the position value of the accelerator pedal is less than or equal to the first reference position upon determining that the state of charge (SOC) value of the battery is less than or equal to the reference amount.

4. The method of claim 3, wherein the determining whether the state data satisfies the control condition includes:
    determining, by the controller, whether a shifting stage of a transmission of the vehicle is a driving (D) stage; and
    determining, by the controller, whether a position value of a brake pedal of the vehicle is less than or equal to a second reference position value upon determining that the shifting stage is the driving (D) stage.

5. The method of claim 1, wherein the determining whether the position value of the accelerator pedal is less than or equal to the first reference position includes:
    determining, by the controller, whether a temperature of a coolant of the engine or a temperature of an oil of the engine is less than or equal to a reference temperature upon determining that the state data satisfies the control condition; and
    determining, by the controller, whether the position value of the accelerator pedal is less than or equal to the first reference position upon determining that the temperature of the coolant or the temperature of the oil is less than or equal to the reference temperature.

6. The method of claim 5, wherein the determining whether the state data satisfies the control condition includes:
    determining, by the controller, whether a shifting stage of a transmission of the vehicle is a driving (D) stage; and
    determining, by the controller, whether a position value of a brake pedal of the vehicle is less than or equal to a second reference position value upon determining that the shifting stage is the driving (D) stage.

7. The method of claim 1, wherein the controlling the brake device includes:
    controlling, by the controller, the brake device so that the vehicle is braked by a control value upon determining that the speed of the vehicle is greater than or equal to the reference speed.

8. The method of claim 1, wherein the controller includes:
    a processor; and
    a non-transitory storage medium on which a program for performing the method of claim 1 is recorded and executed by the processor.

9. A non-transitory computer readable medium on which a program for performing the method of claim 1 is recorded.

10. A device configured for controlling a start of a vehicle, the device including:
    an engine which is a power source of the vehicle;
    a brake device mounted in the vehicle and configured to brake the vehicle;
    a state detector configured to detect state data for controlling the vehicle; and
    a controller connected to the state detector and configured to determine whether revolutions per minute (RPM) of the engine is within a reference range upon determining that the start of the vehicle is requested, determine whether the state data satisfies a control condition for controlling the start of the vehicle upon determining that revolutions per minute (RPM) of the engine is within the reference range, determine whether a position value of an accelerator pedal of the vehicle is less than or equal to a first reference position value upon determining that the state data satisfies the control condition, determine whether a speed of the vehicle is greater than or equal to a reference speed upon determining that the position value of the accelerator pedal is less than or equal to the first reference position value, and control the brake device upon determining that the speed of the vehicle is greater than or equal to the reference speed.

11. The device of claim 10, wherein the controller is configured to determine that the state data satisfies the control condition upon determining that a shifting stage of a transmission of the vehicle is a driving (D) stage and a position value of a brake pedal of the vehicle is less than or equal to a second reference position value.

12. The device of claim 10, wherein the controller is configured to determine whether a state of charge (SOC) value of a battery supplying power to an starter of the vehicle is equal to or less than a reference amount upon determining that the state data satisfies the control condition and to determine whether the position value of the accelerator pedal is less than or equal to the first reference position upon determining that the state of charge (SOC) value of the battery is less than or equal to the reference amount.

13. The device of claim 12, wherein the controller is configured to determine that the state data satisfies the control condition upon determining that a shifting stage of a transmission of the vehicle is a driving (D) stage and a position value of a brake pedal of the vehicle is less than or equal to a second reference position value.

14. The device of claim 10, wherein the controller is configured to determine whether a temperature of a coolant of the engine or a temperature of an oil of the engine is less than or equal to a reference temperature upon determining that the state data satisfies the control condition and to determine whether the position value of the accelerator pedal is less than or equal to the first reference position upon determining that the temperature of the coolant or the temperature of the oil is less than or equal to the reference temperature.

15. The device of claim 14, wherein the controller is configured to determine that the state data satisfies the control condition upon determining that a shifting stage of a transmission of the vehicle is a driving (D) stage and a position value of a brake pedal of the vehicle is less than or equal to a second reference position value.

16. The device of claim 10, further including:
an electronic stability control (ESC) device connected to the controller and configured to stabilize a posture of the vehicle,
wherein the controller is configured to control the brake device using the electronic stability control (ESC) device.

17. The device of claim 10, wherein the state detector includes:
revolutions per minute (RPM) detector connected to the controller and configured to detect the RPM of the engine;
a shifting stage detector connected to the controller and configured to detect a shifting stage of a transmission of the vehicle;
a brake pedal position detector connected to the controller and configured to detect a position value of a brake pedal of the vehicle;
a speed detector connected to the controller and configured to detect the speed of the vehicle;
a state of charge (SOC) detector connected to the controller and configured to detect a state of charge (SOC) value of a battery supplying power to an starter of the vehicle;
a coolant temperature detector connected to the controller and configured to detect a temperature of a coolant of the engine;
an oil temperature detector connected to the controller and configured to detect a temperature of an oil of the engine; and
an accelerator pedal position detector connected to the controller and configured to detect a position value of the accelerator pedal.

* * * * *